United States Patent [19]

Dillmann

[11] Patent Number: 5,131,268
[45] Date of Patent: Jul. 21, 1992

[54] BRAKE ASSEMBLY INCLUDING TORQUE MONITOR

[75] Inventor: Charles W. Dillmann, Morgan Hill, Calif.

[73] Assignee: General Electric Company, San Jose, Calif.

[21] Appl. No.: 549,022

[22] Filed: Jul. 6, 1990

[51] Int. Cl.⁵ .............................................. G01L 5/28
[52] U.S. Cl. ...................................................... 73/121
[58] Field of Search .................... 73/9, 862.09, 862.12, 73/862.14, 862.15, 862.17, 862.19, 862.23, 862.26, 862.32, 121, 126, 129–131, 862.35, 121

[56] References Cited

U.S. PATENT DOCUMENTS

| | | | |
|---|---|---|---|
| 2,403,952 | 7/1946 | Ruge | 73/862.35 |
| 2,744,409 | 5/1956 | Wintle, Jr. et al. | 73/862.17 |
| 2,949,172 | 8/1960 | Simons | 188/171 |
| 3,278,385 | 10/1966 | Dufrane | 176/36 |
| 3,415,115 | 12/1968 | Newell | 73/121 |
| 4,015,696 | 4/1977 | Lichti | 188/189 |
| 4,020,454 | 4/1977 | Malonee | 340/52 B |
| 4,044,622 | 8/1977 | Matthews | 74/424.8 R |
| 4,049,757 | 3/1987 | Crespin | 73/862.12 |
| 4,185,495 | 1/1980 | Ranch et al. | 73/126 |
| 4,293,381 | 10/1981 | Goetzmann et al. | 376/230 |
| 4,475,408 | 10/1984 | Browning | 73/862.12 |
| 4,518,559 | 5/1985 | Fischer et al. | 376/230 |
| 4,716,994 | 1/1988 | Iwamoto | 188/72.2 |
| 4,827,782 | 5/1989 | Torii et al. | 74/89.15 |

FOREIGN PATENT DOCUMENTS 93055 11/1983 European Pat. Off. .
388040 9/1990 European Pat. Off. .

*Primary Examiner*—Robert Raevis
*Attorney, Agent, or Firm*—Robert R. Schroeder

[57] ABSTRACT

A method is disclosed for monitoring braking torque capability of a brake used for selectively braking a shaft of an exemplary control rod drive. The method includes the steps of rotating the shaft, engaging the brake, torsionally restraining the brake for allowing rotation of the brake up to a predetermined maximum angle, and monitoring the angle for monitoring braking torque capability of the brake. A preferred embodiment of a brake assembly for carrying out the method includes a stationary base, a bearing mounted to the base, a brake mounted to the bearing for rotation relative to the base, means for torsionally restraining the brake for allowing rotation of the brake up to the predetermined maximum angle, and means for monitoring the angle. In one embodiment, the torsional restraining means comprises a plurality of springs for providing limited rotation of the brake, and the angle monitoring means comprises a switch which is activated at a predetermined threshold angle of rotation of the brake, or a strain gage which continuously monitors bending strain in the spring for indicating torque-resisting capability of the brake.

21 Claims, 5 Drawing Sheets

BRAKE ASSEMBLY INCLUDING TORQUE MONITOR

TECHNICAL FIELD

The present invention relates generally to control rod drives for nuclear reactor vessels, and, more specifically, to a brake assembly and method for remotely monitoring torque resisting capability of a brake used in the control rod drive.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle threadingly engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

To ensure operability of the brake, the brake is periodically tested. However, the brakes are located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

OBJECTS OF THE INVENTION

Accordingly, one object of the present invention to provide a new and improved brake assembly for a control rod drive.

Another object of the present invention is to provide a brake assembly and method of operation for monitoring torque-resisting capability of the brake.

Another object of the present invention is to provide a brake assembly including a torque monitor allowing for remote testing of the control rod drive brake.

Another object of the present invention is to provide a brake assembly including a torque monitor for testing a control rod drive brake during normal operation of the control rod drive.

DISCLOSURE OF INVENTION

A method is disclosed for monitoring braking torque capability of a brake used for selectively braking a shaft of an exemplary control rod drive. The method includes the steps of rotating the shaft, engaging the brake, torsionally restraining the brake for allowing rotation of the brake up to a predetermined maximum angle, and monitoring the angle for monitoring braking torque capability of the brake. A preferred embodiment of a brake assembly for carrying out the method includes a stationary base, a bearing mounted to the base, a brake mounted to the bearing for rotation relative to the base, means for torsionally restraining the brake for allowing rotation of the brake up to the predetermined maximum angle, and means for monitoring the angle. In one embodiment, the torsional restraining means comprises a plurality of springs for providing limited rotation of the brake, and the angle monitoring means comprises a switch which is activated at a predetermined threshold angle of rotation of the brake, or a strain gage which continuously monitors bending strain in the spring for indicating torque-resisting capability of the brake.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
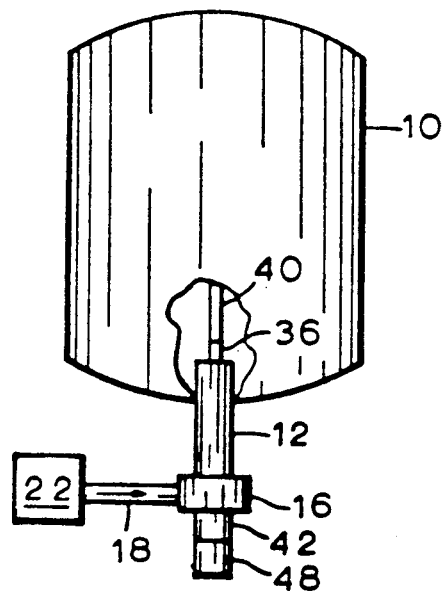
FIG. 1 is a schematic representation of a nuclear reactor vessel including a control rod drive having a brake assembly in accordance with one embodiment of the present invention.
Figure 2:
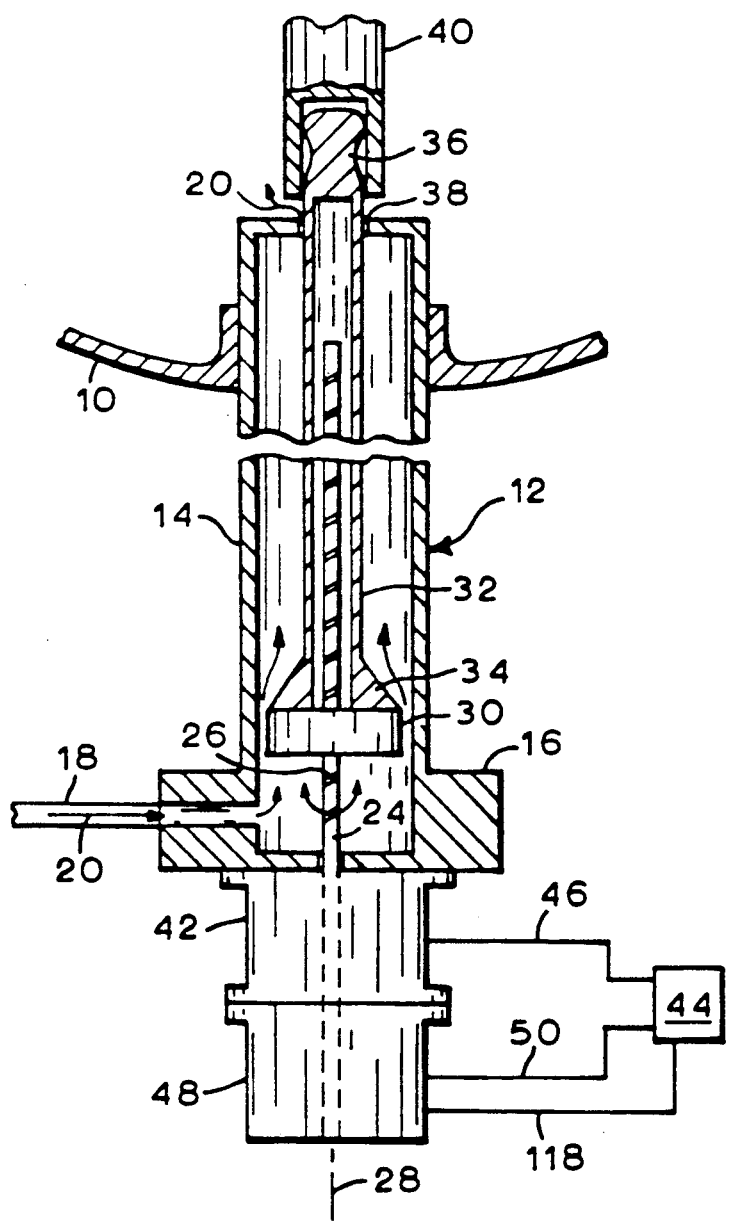
FIG. 2 is an enlarged sectional view, partly schematic, of the control rod drive illustrated in FIG. 1.

Illustrated in FIG. 1 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a manifold 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the manifold 16 through a conventional electrical motor 42 which selectively rotates the spindle 24 in either the clockwise direction or counterclockwise direction. The motor 42 is electrically connected to a conventional control 44 by a conventional electrical line 46 for selectively controlling operation of the motor 42.

In accordance with a preferred embodiment of the present invention, the rod drive 12 further includes a brake assembly 48 joined to the motor 42 into which extends the spindle 24, also referred to as an input shaft 24. The brake assembly 48 is electrically joined to the control 44 by a conventional electrical line 50 for selectively braking and unbraking, or releasing, the input shaft 24.

Figure 3:
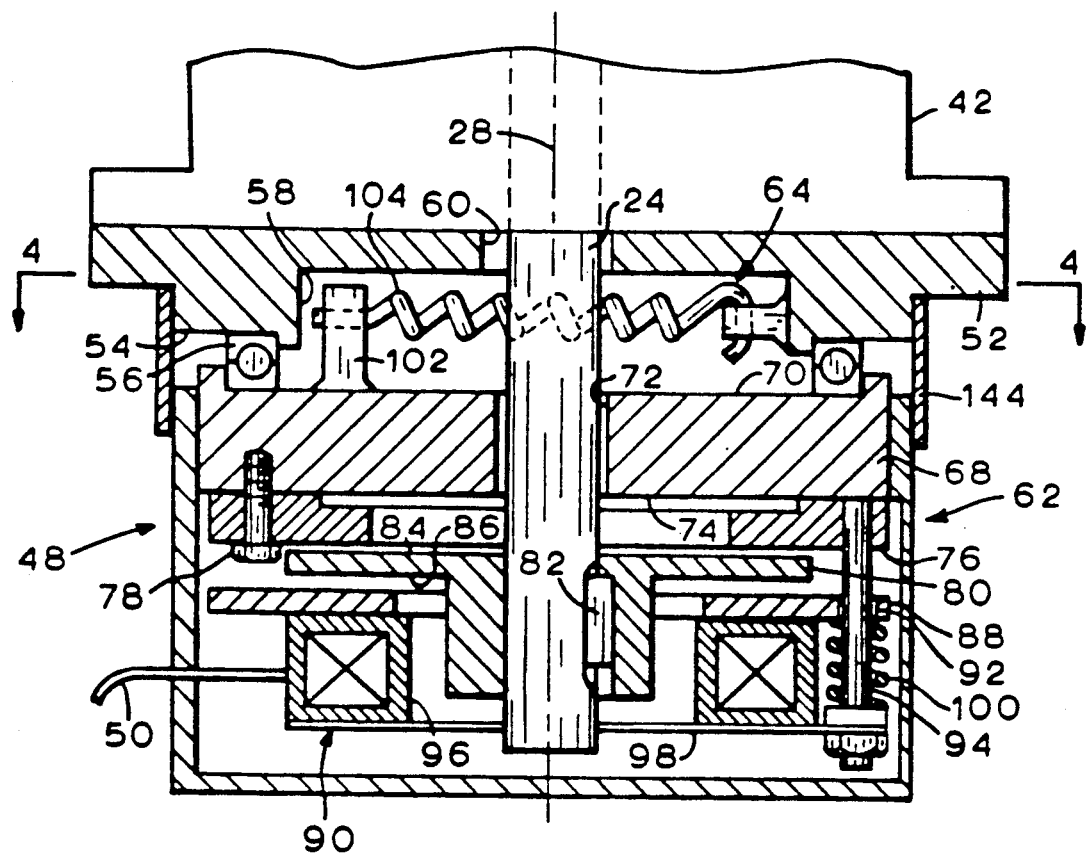
FIG. 3 is a longitudinal transverse sectional view of the brake assembly illustrated in FIGS. 1 and 2 in accordance with one embodiment of the present invention.
Figure 4:
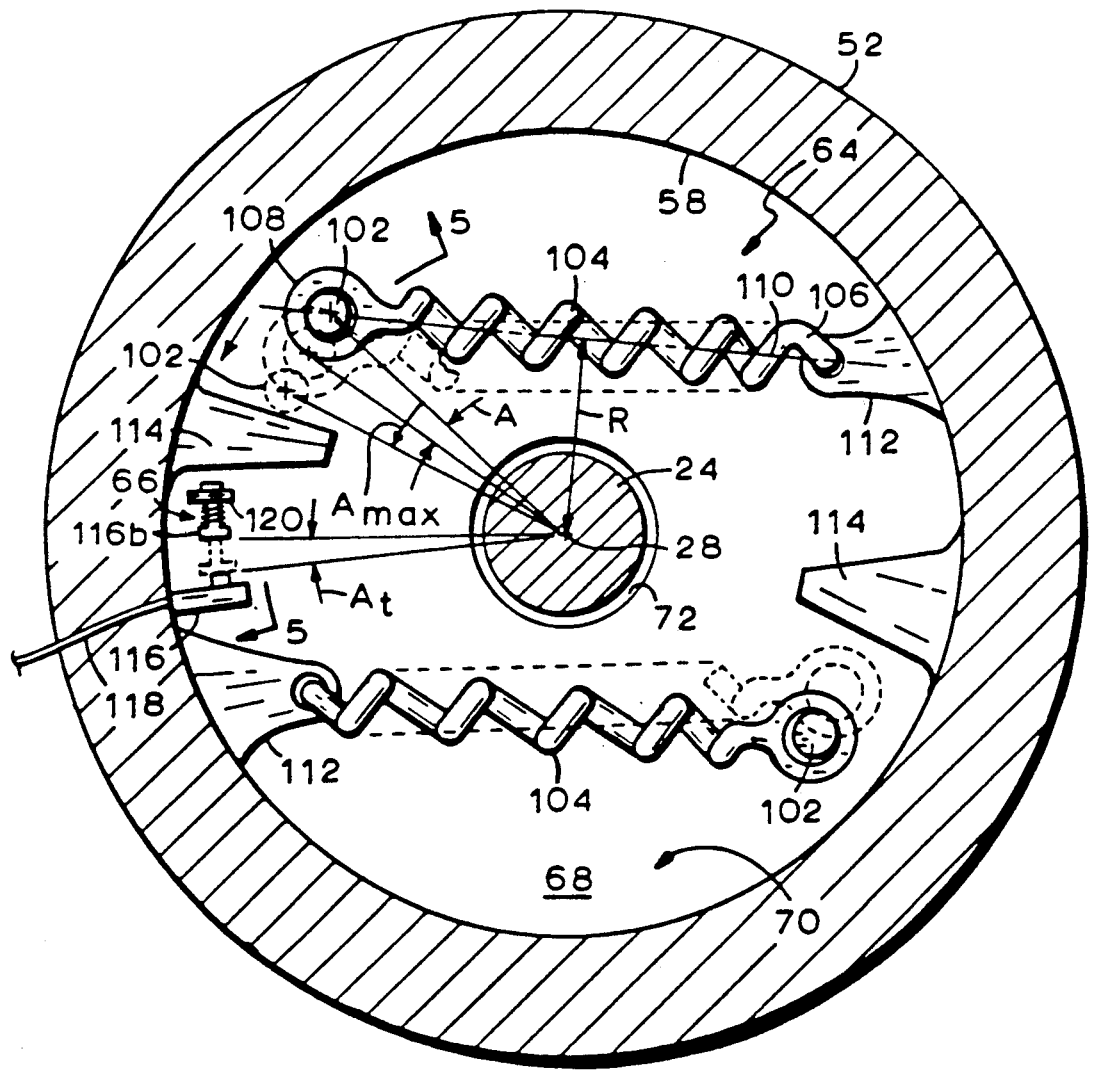
FIG. 4 is a transverse sectional view of the brake assembly illustrated in FIG. 3 taken along line 4—4.

As illustrated in more particularity in FIGS. 3 and 4, the brake assembly 48 includes a stationary base 52 conventionally fixedly secured to the motor 42 by bolts, for example (not shown). The base 52 includes an annular bearing seat 54 to which is conventionally secured a conventional annular bearing 56 disposed coaxially with the spindle 24 about the centerline axis 28. The base 52 also includes an annular recess 58 and a central aperture 60 both disposed coaxially with the centerline axis 28, with the aperture 60 providing access into the brake assembly 48 for the spindle 24.

A conventional electromechanical brake 62 is conventionally mounted to the bearing 56 for controlled and limited rotation relative to the base 52 in accordance with the present invention. The electrical line 50 is connected to the brake 62 and the control 44 is conventionally effective for energizing and de-energizing the brake 62 for selectively braking the input shaft 24 as desired.

More specifically, in accordance with one aspect of the present invention, the brake assembly 48 may be used for practicing an improved method for monitoring the braking torque capability of the brake 62 remotely and during operation of the control rod drive 12. The method includes the steps of rotating the input shaft 24 by energizing the motor 42 while at the same time, engaging the brake 62 for braking the input shaft 24. In a conventional brake assembly, the brake is fixedly connected to the motor 42 and reaction or resisting torque in the brake is transferred to the housing of the motor 42 which is a stationary member. In a conventional braking assembly sized for resisting the maximum output torque of the motor 42, the effectiveness of the brake could be simply tested by energizing the brake and stalling the motor 42. If the motor 42 stalls, the brake provides acceptable braking torque capacity, and if the motor 42 does not stall, then the brake would, therefore, allow slippage, and be unacceptble.

However, with the substantial number of FMCRDs 12 used in the exemplary reactor vessel 10, it is not physically practical to construct a relatively large brake effective for stalling the motor 42, for example. Accordingly, the brake 62 as used for practicing one embodiment of the invention is sized relatively small so that its braking capability is not enough to stall the motor 42 but is adequate for preventing the spindle 24 from reverse rotation due to backflow of the water 20 over the piston 32 when the motor 42 is de-energized and is not running. The brake 62 may be conventionally sized and configured for providing an adequate amount of resisting torque for preventing rotation of the spindle 24 in such occurrence.

In normal operation, the brake 62 is configured to provide braking of the spindle 24 when the brake 62 is de-energized for providing a fail-lock arrangement so that in the event of power cut-off to the brake 62, the brake 62 is actuated for preventing rotation of the spindle 24. For normal insertion and withdrawal of the control rod 40, the brake 62 is energized, and thereby released, for unbraking the spindle 24, and the motor 42 is energized for selectively rotating the spindle 24 either clockwise or counterclockwise for withdrawing or inserting, respectively, the piston 32 and the control rod 40 joined thereto.

In the preferred embodiment, where the brake 62 is not effective for stalling the motor 42, the method in accordance with the present invention nevertheless allows for monitoring the braking torque capability of the brake 62. This is preferably accomplished by torsionally resiliently restraining the brake 62 for allowing limited rotation of the brake 62 relative to the base 52 at an angle A ranging up to a predetermined maximum angle $A_{max}$, and monitoring the angle A for monitoring braking torque capability of the brake 62. Since braking of the shaft 24 results in a reaction torque in the brake 62, that reaction torque can be effectively used in accordance with the present invention by allowing the brake 62 to rotate in direct proportion to the amount of braking torque applied to the shaft 24.

The method may also include allowing the brake 62 to rotate to a predetermined threshold angle $A_t$ less than the maximum angle $A_{max}$ and upon reaching the threshold angle $A_t$ providing an indication, in the form of an electrical signal, for example, that the threshold angle $A_t$ has been reached to indicate that the brake is effective for providing a predetermined threshold torque.

In another embodiment of the method, continuously monitoring the angle of rotation A of the brake 62 may be used for providing a continuous indication of the particular level of torque being resisted by the brake 62.

A significant feature of the method in accordance with the present invention is that the method may be effected by engaging the brake 62 as the control rod 40 is being withdrawn from, or inserted into, the vessel 10. In this way, the brake 62 may be monitored during normal operation of the control rod drive 12 without the need for shutting down the reactor vessel 10 solely for conducting testing of the brakes 62. Furthermore, the angle of rotation A of the brake 62 may be remotely monitored, and therefore, access to the brakes 62 is not required.

Figure 5:
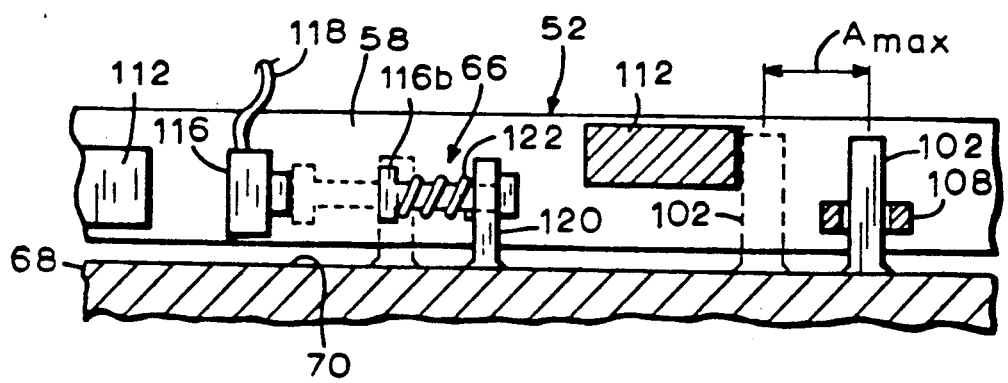
FIG. 5 is a side view of an angle monitoring means of the brake assembly illustrated in FIG. 4 taken along arcuate line 5—5.

Referring again to FIG. 3, one means for accomplishing the method in accordance with the present invention includes means 64 for torsionally resiliently restraining the brake 62 relative to the base 52 for allowing rotation of the brake 62 relative to the base 52 at the angle A up to the predetermined maximum angle $A_{max}$. Means 66, as shown in FIGS. 4 and 5, for monitoring the angle A for monitoring braking torque capability of the brake 62 are also provided.

In a preferred embodiment of the present invention as illustrated in FIGS. 3 and 4, the brake 62 comprises an annular backing plate 68 having a first side 70 facing the recess 58 and conventionally mounted to the bearing 56 for rotation relative to the base 52. The backing plate 68 also includes a central aperture 72, through which passes the shaft 24, and a second, opposite side 74. A conventional annular first braking pad 76 is conventionally fixedly joined to the second side 74 of the backing plate 68, by a plurality of circumferentially spaced bolts 78, for example, only one of which is shown. A conventional rotor disc 80 is conventionally fixedly connected to the input shaft 24 by a conventional key 82, for example. The disc 80 has a first side 84 disposed adjacent to the first pad 76, and a second, opposite side 86. A conventional annular second braking pad 88 is disposed adjacent to the rotor disc second side 86. Conventional means 90 for selectively clamping the first and second pads 76 and 88 against the rotor disc 80 are provided for braking the input shaft 24.

In the preferred embodiment, the clamping means 90 includes a plurality of circumferentially spaced holes 92 along the outer perimeter of the second pad 88, only one of which holes 92 is shown for clarity. A corresponding plurality of elongate bolts 94 extend through the second pad holes 92 and are conventionally fixedly joined to the backing plate 68. A conventional annular electromagnet 96 having an annular support plate 98 is spaced from the second pad 88 and conventionally fixedly joined to bottom ends of the bolt 94, by nuts, for example. A plurality of compression springs 100 are disposed around respective ones of the plurality of bolts 94 and positioned between the second pad 88 at the holes 92 and the electromagnet support plate 98. The springs 100 are predeterminedly initially compressed for applying a predetermined clamping force on the second pad 88 for clamping the rotor disc 80 between the first and second pads 76 and 88 when the electromagnet 96 is de-energized for braking the input shaft 24.

Figure 7:
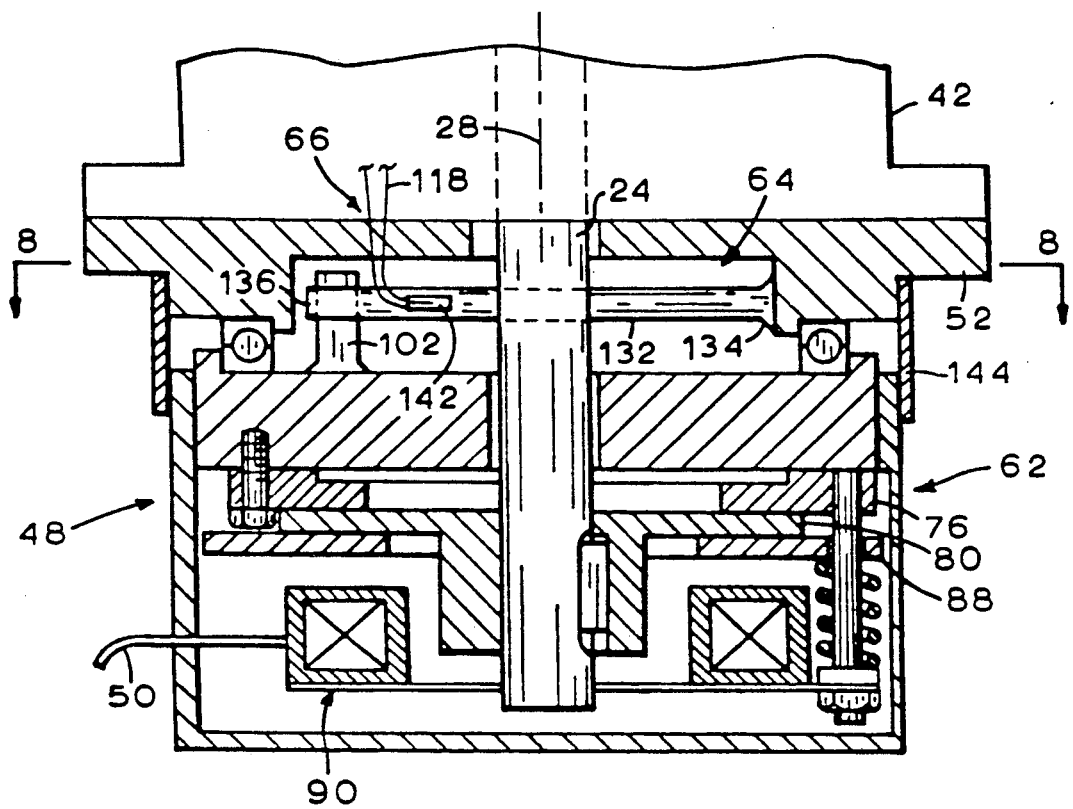
FIG. 7 is a longitudinal transverse sectional view of an alternate embodiment of the brake assembly illustrated in FIG. 3.

In the preferred embodiment, the second pad 88 is magnetic so that when the electromagnet 96 is energized by electrical power provided through the electrical line 50, the electromagnet 96 magnetically draws the second pad 88 away from the rotor disc 80 and further compresses the compression springs 100 for releasing, or unbraking, the input shaft 24. The unbraked, energized mode of electromagnet 96 is illustrated in FIG. 3 which allows for a predetermined amount of clearance between the rotor disc 80 and the first and second pads 76 and 88 for allowing the rotor disc 80 to rotate freely without restraint from the brake 62. When the electromagnet 96 is de-energized (as shown in FIG. 7), the electromagnet 96 allows the second pad 88 to move toward the second side 86 of the rotor 80 by the force imposed thereon by the compression springs 100. The key 82 which secures the rotor disc 80 to the shaft 24 prevents rotation of the disc 80 relative to the shaft 24 while allowing a predetermined amount of axial sliding of the disc 80 so that the second pad 88 forces the disc 80 against the first pad 76 and thus clamps the rotor disc 80 between the first and second pads 76 and 88.

The second braking pad 88 may be entirely metal of a suitable conventional composition for being magnetically drawn by the electromagnet 96 when energized or may, alternatively, be a magnetic metal plate with a conventional braking material disposed on the surface thereof facing the rotor disc second side 86. The coefficients of friction between the rotor disc 80 and the first and second braking pads 76 and 88 are conventionally determined, along with particular spring constants for the springs 100 for generating clamping force therefrom for each particular application. The clamping force is preselected for providing a predetermined, threshold torque to the rotor disc 80 for restraining rotation thereof. The amount of the threshold torque is preselected for preventing rotation of the shaft 24 by torque applied thereto from the piston 32 in the backflow occurrence described above with respect to FIG. 2.

In such a backflow occurrence, water from the vessel 10 will enter the housing 14 through the aperture 38 and flow backwards past the piston 32 into the manifold 16. Pressure forces acting against the piston 32 will tend to drive the piston 32 and the ball nut 30 downward or away from the reactor vessel 10. If the spindle/shaft 24 is unrestrained by either energization of the motor 42 or activation of the brake 62, the spindle 24 will be forced to rotate in a clockwise direction, which will allow the ball nut 30 to move away from the vessel 10 and thus withdraw the piston 32 and the control rod 40. By actuating the brake 62, the clamping threshold torque will be applied to the rotor disc 80 for preventing the ball nut 30 from moving longitudinally, and thus preventing withdrawal of the control rod 40. However, the torque generating capability of the motor 42 is preselected to be larger than the threshold torque provided by the brake 62 to allow the motor to operate without stalling for further inserting the control rod 40 even with the brake 62 applied as desired.

Referring to FIGS. 3 and 4, the torsional restraining means 64 is disclosed in more detail in accordance with one embodiment. The restraining means 64 includes at least one and preferably two pins 102 conventionally fixedly secured to the first side 70 of the backing plate 68 and extending outwardly therefrom into the recess 58 of the base 52. At least one, and preferably two, coil springs 104 extend from the base 52 within the recess 58 generally perpendicular to the centerline axis 28 and are pivotally connected to respective pins 102. Each spring 104 includes a proximal end 106 and a tubular distal end 108 and a longitudinal centerline axis 110 extending therebetween. The spring proximal end 106 is pivotally attached in a hole in a conventional support member 112 fixedly joined to the base 52 in the recess 58. The spring distal end 108 is positioned over the pin 102 for pivotal movement with respect thereto. In the preferred embodiment, the two coil springs 104 are disposed generally parallel to each other, and each spring 104 is spaced radially outwardly from the centerline axis 28 at a radius R measured to the spring centerline axis 110.

FIG. 4 illustrates in solid line the initial positions of the springs 104 with the brake 62 released from the input shaft 24. When the brake 62 is activated and the shaft 24 is restrained from rotation, in the event of the backflow occurrence described above, the fluid pressure force will be directed downward against the ball nut 30 as illustrated in FIG. 2, which will generate a reversing torque to rotate the shaft 24 in a clockwise direction since, in this exemplary embodiment, the shaft 24 includes right-handed threads 26. Accordingly, the springs 104 are preferably sized and configured for providing a restraining force on the pins 102 for torsionally resiliently restraining the backing plate 68 which supports the first and second braking pads 76 and 88 which are clamped against the rotor disc 80 in this mode of operation. The reversing torque due to the backflow forces on the shaft 24 are channeled through the rotor disc 80 and to the first and second braking pads 76 and 88 which will then cause the backing plate 68 to rotate clockwise when viewed from the bottom of the brake 62 looking upwards toward the vessel 10 since right-handed threads 26 are provided on the shaft 24. The springs 104 are sized and configured for allowing a predetermined limited amount of rotation of the backing plate 68 relative to the base 52 at the angle A ranging from zero degrees to the predetermined maximum angle $A_{max}$.

In the preferred embodiment, the two springs 104 are configured for torsionally restaining the backing plate 68 in only one direction of rotation of the input shaft 24, i.e. the direction of the input shaft 24 caused by the reversing torque from the backflow forces described above, which in this embodiment restrains the backing plate from rotating in the clockwise direction. As shown in FIG. 4, this may be accomplished by configuring the springs 104, the pins 102 and the support member 112 for allowing the spring 104 to extend, or elongate, with rotation of the backing plate 68 at the angle A relative to the base 52. Extension of the coil springs 104 will thusly provide a corresponding increasing restraining tension force between the support member 112 and the pin 102. As the backing plate 68 rotates at the angle A, the springs 104 provide the restraining force on the pins 102 which is directly proportional to the torque resisting capability of the brake 62.

For example, when the brake 62 is not actuated, no resisting torque will be applied to the rotor disc 80 and therefore the backing plate 68 does not move relative to the base 52 and the angle A has a value of zero. When the brake 62 is actuated and the first and second pads 76 and 88 clamp the rotor disc 80, then reversing torque transmitted through the rotor disc 80 will cause the backing plate 68 to rotate to the angle A, which rotation is restrained by the springs 104. As more and more reversing torque is transmitted through the rotor disc 80 to the backing plate 68, the angle A will increase until, for example, slippage of the rotor disc 80 between the first and second braking pads 76 and 88 occurs, which is one way for limiting rotation of the backing plate 68.

Since, in the preferred embodiment, the brake 62 is predeterminedly configured for generating a preferred threshold torque for resisting a predetermined amount of reversing torque from the backflow condition, the springs 104 need only be sized and configured for accommodating at least the predetermined threshold torque. The size of the springs 104 and orientation thereof relative to the centerline axis 28, including for example the distance R, may be preselected for particular applications for maximizing the restraining force a-plied to the pin 102 while minimizing the size of the components. For example, by increasing the radius R, the moment arm associated with the restraining force applied at the pin 102 by the spring 104 increases, thusly increasing the restraining torque applied to the backing plate 68. Two springs 104 are preferred for redundancy and for dividing the required restraining forces and torques for having correspondingly smaller springs 104. In alternate embodiments, either one spring 104 or more than two springs could also be used.

Also in the preferred embodiment as illustrated in FIG. 4, the torsional restraining means 64 further includes a stop member 114 fixedly joined to the base 52 in the recess 58 adjacent to each pin 102. The stop member 114 is predeterminedly spaced from the pin 102 for limiting rotational travel of the backing plate 68 to the predetermined maximum angle $A_{max}$. A sudden application of the backflow against the piston 32 may instantaneously cause rotation of the backing plate 68 to undesirably large angles A, and therefore stop member 114 may be used to prevent excessive rotation of the backing plate 68 by preventing the pin 102 from rotating past the stop member 114. Furthermore, in the event of breakage of one or both springs 104, the stop member 114 will prevent the backing plate 68 from unrestrained rotation which would prevent braking of the shaft 24. FIG. 4, and additionally FIG. 5, shows the pin 102 in an initial position in solid line, and, in dashed line, at a maximum rotational position butting against the stop member 112 at the angle $A_{max}$.

The limited rotation of the backing plate 68 by the torsional restraining means 64 provides an effective mechanism for monitoring or testing the torque-resisting capability of the brake 62. For example, the angle monitoring means 66 as illustrated in FIGS. 4 and 5 may comprise a conventional switch, or microswitch, 116 suitably fixedly connected to the base 52 in the recess 58. The switch 116 is simply a series switch connecting a pair of electrical lines 118 to the control 44. A switching plunger 116b is slidably joined to a brace 120 extending outwardly from the backing plate 68. The plunger includes a compression spring 122 between the head of the plunger and the brace 120 for initially positioning the plunger 116b at an extended position relative prior to contacting the switch 116. The plunger 116b is predeterminedly spaced from the switch 116 for allowing the backing plate 68 to rotate up to the threshold angle $A_t$ before the plunger 118 contacts, and therefore closes, the switch 116. The switch 116 is open at values of the angle A up to the threshold angle $A_t$ and is closed at values of the angle A at and above the threshold angle $A_t$.

The switch 116, in the preferred embodiment, is therefore a normally open switch, but in alternate embodiments of the invention, a normally closed switch 116 could also be suitably used. The threshold angle $A_t$ is that angle associated with the predetermined threshold torque required from the brake 62 for preventing rotation of the shaft 24. The threshold torque is the minimum preferred amount of resisting torque from the brake 62 and the switch 116 may be used for providing either a YES or NO indication as to the effectiveness of the brake 62. During normal operation of the motor 42 as it withdraws the ball nut 30 by rotating the shaft 24 clockwise, the electromagnetic 96 can be de-energized for testing by activating the brake 62 and providing a resisting torque to the shaft 24. Since in the preferred embodiment, the motor 42 is effective for rotating the shaft 24 even with the brake 62 actuated, the rotor disc 80 will therefore simply slide relative to the first and second braking pads 76 and 88 with a resisting torque being applied to the rotor disc 80. The resisting torque will, by reaction, cause the backing plate 68 to rotate at values of the angle A greater than zero, which is directly proportional to the amount of the resisting torque provided by the brake 62. By selecting the threshold angle $A_t$ to be that angle associated with the preferred amount of threshold torque applied by the brake 62, the switch 116 will be activated, or closed, when the brake 62 provides at least the threshold torque for rotating the backing plate to at least the threshold angle $A_t$. If the torque applied by the brake 62 does not reach the preferred threshold torque, the backing plate 68 will note rotate to the threshold angle $A_t$ and therefore the plunger 116b will not contact the switch 116 leaving the switch 116 open.

Accordingly, the resisting torque capability of the brake 62 may be simply tested or monitored during operation of the control rod drive 12 by simply actuating the brake 62 to determine whether an adequate amount of resisting torque is applied to the rotor disc 80 for closing the switch 116. If the switch 116 is not closed, then the testing of the brake 62 indicates the inadequacy thereof, and the control 44 may so indicate. If the switch 116 is closed, the control 44 will provide an indication of acceptable operation of the brake 62.

If the brake 62 provides more resisting torque than the threshold torque, the rotational angle A of the backing plate 68 will be larger than the threshold angle $A_t$ and the plunger 116b will be compressed against the switch 116. By slidably mounting the plunger 118 through the brace 120 and providing the compression spring 122, the plunger is retractable relative to the brace 120 by compression of the compression spring 122 when the plunger 118 contacts the switch 116 for preventing damage thereof.

Figure 6:
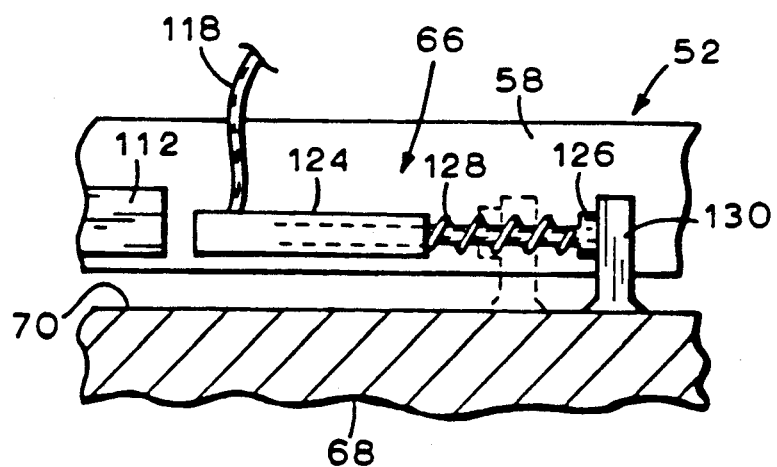
FIG. 6 is a view similar to FIG. 5 showing an alternate embodiment of the angle monitoring means illustrated in FIGS. 4 and 5.

Other angle monitoring means 66 could also be utilized for measuring and monitoring the angular rotation A of the backing plate 68. For example, illustrated in FIG. 6 is another embodiment of the angle monitoring means 66 which includes a conventional linear potentiometer 124 suitably joined to the base 52 within the recess 58 which is electrically connected through the electrical lines 118 to the control 44, and which includes an extendable rod 126. Disposed around the rod 126 is a conventional compression spring 128 for initially extending the rod 126. A brace 130 conventionally extends from the backing plate first side 70 and is positioned adjacent to the rod 126 for displacing the rod 126 as the backing plate 68 rotates to the angle A. As the value of the angle A increases, the brace 130 pushes the rod 126 into the potentiometer 124, which provides a signal directly proportional to the amount of rotation of the backing plate 68. The potentiometer 124 is thusly effective for continuously monitoring the angle A for providing a continuous indication of the torque being resisted by the brake 62. The control 44 may provide a visual indication of the actual amount of resisting torque due to the brake 62, or may alternatively provide a YES-NO indication as to the adequacy of the brake 62, as may be conventionally done utilizing a threshold signal in the control 44.

Referring again to FIG. 3, an annular seal 144 preferably joins the base 52 to the brake 62 for protecting the components therebetween. The seal 144 may be conventionally fixedly attached at one end to the base 52 and, at its opposite end be disposed in sliding sealing contact with the outer surface of the brake 62. Other seals could also be used as desired.

Figure 8:
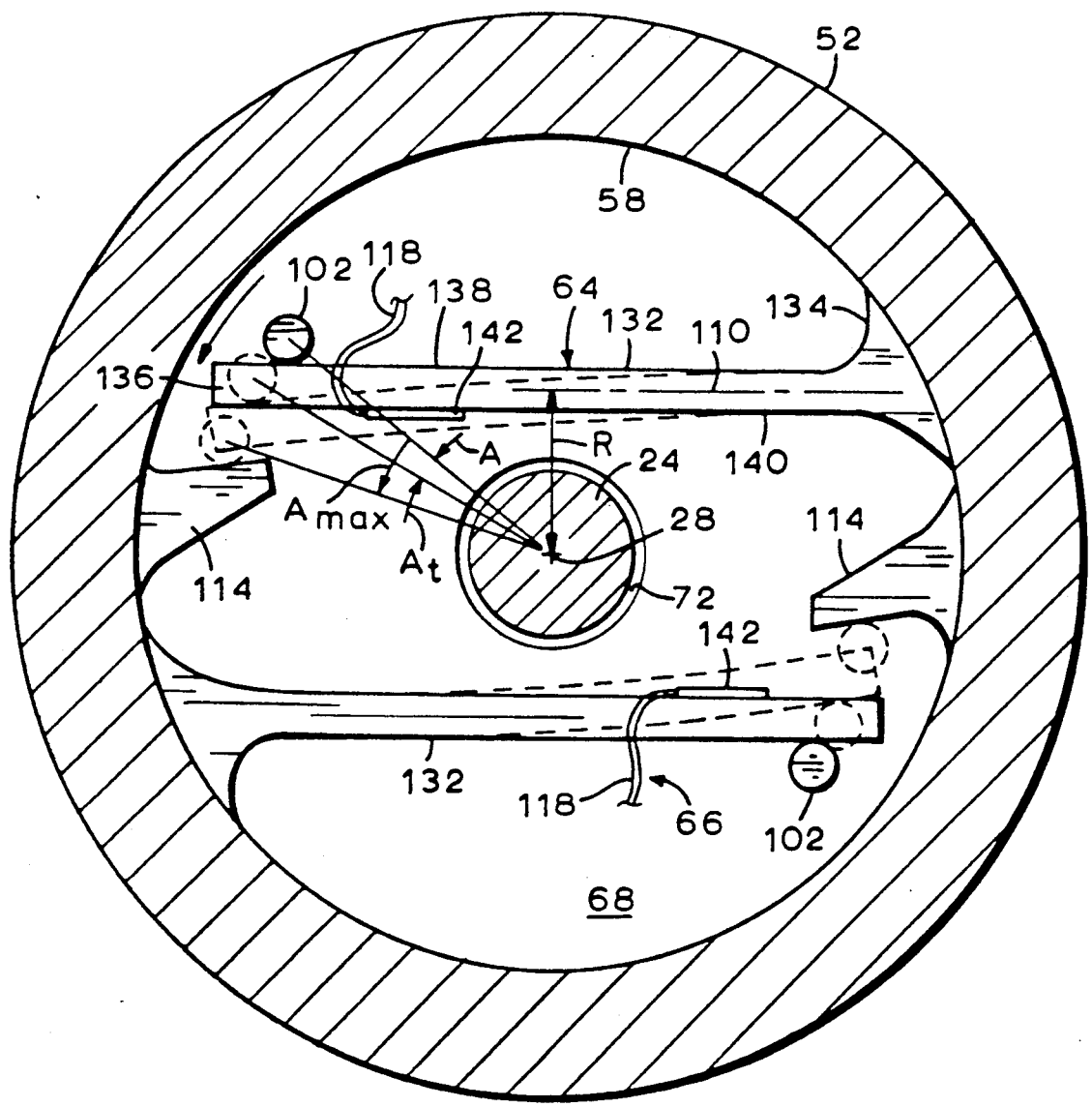
FIG. 8 is a transverse sectional view of the brake assembly illustrated in FIG. 7 taken along line 8—8.

Illustrated in FIGS. 7 and 8 is an alternate embodiment of the brake assembly 48 which is identical to the embodiment illustrated in FIGS. 3 and 4 except for alternate embodiments of the torsional resisting means 64 and the angle monitoring means 66. More specifically, the torsional resisting means 64 comprises at least one, and in the preferred embodiment, two cantilever beams 132 each having a longitudinal axis, also designated 110. Each of the beams 132 includes a proximal end 134 conventionally fixedly connected to the base 52 in the recess 58, for example, by being formed integrally therewith. Each beam 132 also includes a distal end 136 disposed adjacent to the pin 102. In the preferred embodiment, the two beams 132 are oriented substantially parallel to each other and are spaced from the longitudinal axis 28 at the radius R relative to the longitudinal axis 110.

Each of the beams 132 preferably includes a rectangular cross section, but may have any type of cross section having an effective moment of inertia for providing a restraining force against pin 102 upon bending of the beam 132. Each beam 132 has first and second opposite sides 138 and 140, respectively, with the pin 102 being disposed adjacent to the first side 138 so that as the backing plate 68 rotates to values of the angle A greater than zero, the pin 102 contacts the beam first side 138 and bends the beam 132 relative to its proximal end 134. Bending of the beam 132 thusly provides a restraining force against the pin 102. This restraining force is directly proportional to bending stresses and strains in the beam 132 and is also directly proportional to the resisting torque generated by the brake 62.

Accordingly, the value of the resisting torque generated by the brake 62 when actuated (as shown in FIG. 7) for resisting rotation of the shaft 24 may be determined from measuring, or monitoring, the bending of the beam 132. This may be done, for example, by having the angle monitoring means 66 in the form of a conventional strain gage 142 conventionally fixedly secured to a side surface, such as either the first side 138 or the second side 140, of at least one of the beams 132 which side surface is subject to bending strain as the pin 102 bends the beam 132 upon rotation of the backing plate 68 to the angle A. The strain gage 142 is conventionally connected to the control 44 through the electrical lines 118 for providing a signal indicating bending strain of the beam, or spring, 132 as the backing plate 68 rotates to the angle A.

Accordingly, the strain gage 142 may be provided for continuously monitoring the angle A for providing a continuous indication of the torque being resisted by the brake 62 when actuated for resisting rotation of the shaft 24. The control 44 may conventionally provide a visual indication of the actual value of the resisting torque generated by the brake 62, or may provide a YES-NO indication of the adequacy of the brake 62 for providing the threshold torque for rotating the backing plate 68 to the threshold angle $A_t$.

As illustrated in FIG. 8, the beam 132 is shown in solid line in its initial unbent condition, and in dashed line in its bended condition, wherein the pin 102 rotates with the backing plate 68 to the threshold angle $A_t$. The stopping members 114 are also utilized in the embodiment illustrated in FIG. 8, to either limit the travel of the beam 132 to the predetermined maximum angle $A_{max}$, or, in the event of brakeage of one or both beams 132, the pin 102 is limited to a maximum rotational travel at the angle $A_{max}$.

Although the torsional resisting means 64 as disclosed above may comprise either coil springs 104 or cantilever beam springs 132, other types of spring retention means could also be utilized for resiliently restraining rotation of the brake 62 relative to the base 52. In both of the embodiments illustrated above, the coil springs 104 and the beams 132 provide increasing restraining force against the pins 102 as A increases in value, and are effective for torsionally restraining the backing plate 68 in only one direction of rotation of the input shaft 24, i.e. the clockwise rotation, for restraining reverse rotation of the shaft 24 due to the above-described backflow condition. Accordingly, the torque-resisting capability of the brake 62 may be tested or monitored only when the motor 42 is energized for withdrawal the control rod 40 from the vessel 10.

Figures 9, 10:
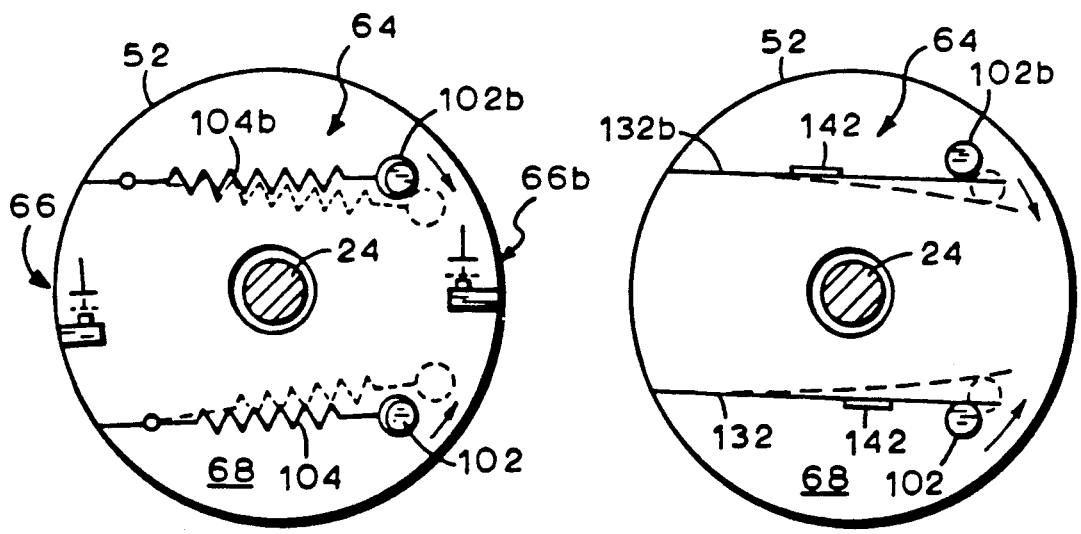
FIG. 9 is a schematic representation analogous to the FIG. 4 embodiment showing an alternate embodiment of torsional restraining means according to the present invention.
FIG. 10 is a schematic representation analogous to the FIG. 8 embodiment showing an alternate embodiment of the torsional resisting means therein.

FIGS. 9 and 10 illustrate schematically two additional embodiments of the torsional restraining means 64 analogous to the embodiments illustrated in FIGS. 4 and 8, respectively. In FIG. 9, one of the two coil springs 104 designated 104b is oriented in a direction opposite to the first coil spring 104 and the respective pin designated 102b is also disposed oppositely to the pin 102 associated with the first coil spring 104. Similarly, in FIG. 10, one of the beams designated 132b is also disposed oppositely to the other beam 132 and the respective pin designated 102b is disposed oppositely to the other pin 102. In both embodiments illustrated in FIGS. 9 and 10, the opposite arrangement of the springs 104, 104b and the beams 132, 132b provide restraining force against the pins 102, 102b when the brake 62 is actuated for rotation of the shaft 24 in either a clockwise or counterclockwise direction. In the clockwise direction of rotation of the shaft 24, the coil spring 104 extends for restraining rotation while the other spring 104b is slackened or compressed, and one of the beams 132 is bent while the other beam 132b is unaffected by the corresponding pin 102b. When the backing plate 68 is rotated in an opposite, counterclockwise, direction, the coil spring 104b is instead extended by the pin 102b while the other coil spring 104 is slackened or compressed by the pin 102, and the beam 132b is bent by the pin 102b while the second beam 132 is unaffected by movement of the pin 102. In these embodiments, each of the coil springs 104,104b and beams 132,132b is predeterminedly sized for providing the total required restraining force to the respective pins 102,102b for restraining rotation of the backing plate 68. Accordingly, each spring 104 and beam 132 would be sized relatively larger than the corresponding springs 104 and beams 132 illustrated in FIGS. 4 and 8 since one spring/beam is utilized for restraining rotation of the backing plate 68 where previously two springs/beams were used.

In the preferred embodiment of the invention, the threshold angle $A_t$ is preferably within the range of about 2°-5° for being large enough to avoid premature actuation of the switch 116 yet being small enough for preventing undesirably large rotation of the backing plate 68. The stopping members 114 are positioned for obtaining the maximum angle $A_{max}$ which is about twice the value of the threshold value $A_t$, for example, up to about 10°.

The above-described embodiments of the present invention thusly provide relatively simple means for testing or monitoring the torque-resisting capability of the brake 62 remotely from the brake 62 and during operation of the control rod drive 12. Even though a substantial number of control rod drives 12 may be utilized in the reactor vessel 10, for example about 205 control rod drives, the present invention allows for relatively quick testing of each control rod drive which may all be done either simultaneously or sequentially. The monitoring may be done either utilizing the switch 116, for example, for providing a YES-NO indication of the adequacy of each brake 62, or may be done continuously with the control 44 providing a continuous readout of the torque-resisting capability of the respective brakes 62 for observing, for example, any gradual reduction in effectiveness thereof.

While there have been described herein what are considered to be preferred embodiments of the present invention, other modifications of the invention shall be apparent to those skilled in the art from the teachings herein and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A brake assembly for selectively braking rotation of an input shaft extending from a control rod drive having a longitudinal centerline axis, said shaft being rotatable for selectively inserting and withdrawing a control rod in a nuclear reactor vessel, and said brake assembly comprising:

a stationary base;

an annular bearing mounted to said base;

a brake mounted to said bearing for rotation relative to said base and effective for selectively braking said input shaft, said brake including:

a backing plate mounted to said bearing for rotation relative to said base;

a first braking pad fixedly joined to said backing plate;

a rotor disc fixedly connected to said input shaft and disposed adjacent to said first pad;

a second braking pad disposed adjacent to said rotor disc; and means for selectively clamping said first and second pads against said rotor disc for braking said input shaft;

means for torsionally restraining said brake including:
a pin extending outwardly from said backing plate toward said base; and
a spring extending from said base to said pin and generally perpendicular to said centerline axis, said spring being sized and configured for providing a restraining force on said pin for torsionally restraining said backing plate for allowing rotation of said backing plate relative to said base at an angle up to a predetermined maximum angle greater than zero degrees; and means for monitoring said angle for monitoring braking torque capability of said brake.

2. A brake assembly according to claim 1 wherein said torsional restraining means comprises two of said pins and said springs joined to said backing plate and said base, respectively.

3. A brake assembly according to claim 2 wherein said two springs are configured for torsionally restraining said backing plate in only one direction of rotation of said input shaft.

4. A brake assembly according to claim 2 wherein said two springs are configured so that a first spring is effective for torsionally restraining said backing plate in only a clockwise direction of rotation of said input shaft, and a second spring is effective for torsionally restraining said backing plate in only a counterclockwise direction of rotation of said input shaft.

5. A brake assembly according to claim 1 wherein said spring comprises a coil spring.

6. A brake assembly according to claim 5 wherein said spring is sized between said base and said pin for providing said restraining force upon extension thereof as said backing plate rotates to said angle.

7. A brake assembly according to claim 1 wherein said spring comprises a cantilever beam.

8. A brake assembly according to claim 1 wherein said torsionally restraining means further comprises a stop member fixedly joined to said base and predeterminedly spaced from said pin for contacting said pin for limiting rotational travel of said backing plate to said predetermined maximum angle.

9. A brake assembly according to claim 1, wherein said angle monitoring means comprises:
a switch joined to said base;
a switching plunger joined to said backing plate; and
said plunger being predeterminedly spaced from said switch for allowing said backing plate to rotate up to a threshold angle before said plunger contacts said switch, said switch being open at values of said angle up to said threshold angle and being closed at values of said angle at and above said threshold angle.

10. A brake assembly according to claim 9 wherein said plunger is slidably joined to a brace extending outwardly from said backing plate, and includes a compression spring for initially positioning said plunger at an extended position prior to contacting said switch, and said plunger being retractable relative to said brace by compression of said compression spring by contact of said plunger with said switch at values of said angle greater than about said threshold angle.

11. A brake assembly according to claim 1 wherein said angle monitoring means comprises a strain gage joined to said spring for providing a signal indicating bending strain of said spring as said backing plate rotates to said angle.

12. A brake assembly according to claim 1 wherein said spring is a cantilever beam and said strain gage is joined to a side surface of said beam subject to bending strain as said pin bends said beam upon rotation of said backing plate to said angle.

13. A brake assembly according to claim 1 wherein said angle monitoring means comprises:
a potentiometer joined to said base and having an extendable rod;
a brace extending from said backing plate and positioned adjacent to said rod for displacing said rod as said backing plate rotates to said angle; and
said potentiometer providing a signal being proportional to said angle.

14. A braking assembly according to claim 1 wherein said clamping means comprises:
said second pad including a plurality of circumferentially spaced holes;
a plurality of bolts extending through said second pad holes and fixedly joined to said backing plate;
an electromagnet spaced from said second pad and fixedly joined to said bolts;
a plurality of compression springs disposed around said plurality of bolts, respectively, positioned between said second pad and said electromagnet, and being predeterminedly compressed for applying a predetermined clamping force on said second pad for clamping said rotor disc between said first and second pads when said electromagnet is de-energized for braking said input shaft; and
said second pad being magnetic so that when said electromagnet is energized, said electromagnet draws said second pad away from said rotor disc and further compresses said compression springs for unbraking said input shaft.

15. A brake assembly according to claim 14 wherein said torsional restraining means comprises:
two spaced pins extending outwardly from said backing plate; and
two springs extending from said base to said pins, respectively, each spring being sized and configured for providing restraining forces on said pins for torsionally restraining said backing plate for allowing rotation of said backing plate relative to said base at said angle up to said predetermined maximum angle.

16. A brake assembly according to claim 15 wherein each of said springs comprises a coil spring and is sized between said base and said pin for providing said restraining force upon extension thereof as said backing plate rotates to said angle.

17. A brake assembly according to claim 16 wherein said angle monitoring means comprises:
a switch joined to said base;
a brace extending outwardly from said backing plate;
a switching plunger slidably joined to said brace;
a compression spring disposed around said plunger for initially positioning said plunger at an extended position relative to said brace; and
said plunger being predeterminedly spaced from said switch for allowing said backing plate to rotate up to a threshold angle before said plunger contacts said switch, said switch being open at values of said angle up to said threshold angle and being closed at values of said angle at and above said threshold angle, said plunger being retractable relative to said brace by compression of said compression spring by contact of said plunger with said switch at values of said angle greater than about said threshold angle.

18. A brake assembly according to claim 17 wherein said torsional restraining means further comprises two stop members fixedly joined to said base and predeterminedly spaced from said pins, respectively, for contacting said pins for limiting rotational travel of said backing plate to said predetermined maximum angle.

19. A brake assembly according to claim 15 wherein said two springs comprise two cantilever beams.

20. A brake assembly according to claim 19 wherein said angle monitoring means comprises a strain gage joined to a side surface of at least one of said beams subject to bending strain as said pin bends said beam upon rotation of said backing plate to said angle, said strain gage providing a signal indicating bending strain of said spring as said backing plate rotates to said angle.

21. A brake assembly according to claim 20 wherein said torsional restraining means further comprises two stop members fixedly joined to said base and predeterminedly spaced from said pins, respectively, for contacting said pins for limiting rotational travel of said backing plate to said predetermined maximum angle.

* * * * *